Fig. 2.

March 10, 1953 — J. J. O'KANE — 2,630,743
APPARATUS FOR PHOTOGRAPHING TYPE MATTER FROM COMPOSED LINES
Filed Nov. 14, 1949 — 9 Sheets-Sheet 3

Fig. 3.

INVENTOR
John J. O'Kane
By George W. Gardes
ATTORNEYS

J. J. O'KANE

2,630,743

APPARATUS FOR PHOTOGRAPHING TYPE
MATTER FROM COMPOSED LINES

Filed Nov. 14, 1949

Inventor
John J. O'Kane
George W. Gardes
By
ATTORNEYS

J. J. O'KANE

2,630,743

APPARATUS FOR PHOTOGRAPHING TYPE MATTER FROM COMPOSED LINES

Filed Nov. 14, 1949

Inventor
John J. O'Kane
George W. Gardes.
By
ATTORNEYS

Patented Mar. 10, 1953

2,630,743

UNITED STATES PATENT OFFICE 2,630,743

APPARATUS FOR PHOTOGRAPHING TYPE MATTER FROM COMPOSED LINES

John J. O'Kane, Dedham, Mass.

Application November 14, 1949, Serial No. 127,213

14 Claims. (Cl. 95—4.5)

(Granted under Title 35, U. S. Code (1952), sec. 266)

The invention described herein may be manufactured and used by or for the Government for governmental purposes, without payment to me of any royalty thereon.

This invention relates generally to a camera but more specifically to an apparatus used to photograph matrices as are used in Linotype machines.

The apparatus is designed for photographically reproducing the type on matrices which are aligned in the mold bar of a Linotype machine to which the apparatus may be conveniently attached for operation therewith.

One object of the invention is to provide a device which will produce a negative or positive on film or paper direct from the matrix casting machine, and thus eliminate the casting of the molten metal, the inking of the metal and the taking of a proof.

Another object of the invention is to provide a supplemental photographic apparatus, with specially designed features, to be attached to a standard machine which casts matrices and to perform a service which the original machine does not perform at present.

Referring to the drawings in which like parts are indicated by similar reference characters:

Fig. 15 is a disassembled perspective view of the switch discs for controlling circuits to various electrically operated elements of the apparatus.

Briefly stated, the instant invention comprises a photographic apparatus which is located adjacent a Linotype machine and is connected to the space band bar thereof, and is used to photograph the Linotype or Intertype brass matrices which normally would be used for casting a line of type.

In the ordinary procedure the lines of type are taken from the Linotype machine, inked up and a proof taken. The proof may then be used as stick up material to make up pages of books, newspapers and for advertising material. This would in turn be photographed to produce a negative or positive for making an offset lithographic plate.

The device set forth in the instant invention eliminates the casting of the molten metal, the inking of the metal; the taking of a proof; to wit: it produces a negative or positive on film or paper direct from the matrix casting machine.

The camera consists of an outer casing 10 provided with a top door 11 which is connected to the casing by the hinges 12 and which may be retained in closed position by the latch 13. The casing is also provided with a side door 14, which is connected thereto by the hinges 15 and which may be retained in closed position by the latch 16.

In the upper portion of the casing 10 is slidably mounted the camera back 17 which is provided with grooved side members 17' to engage the tracks 10' attached to either side of the casing. The camera back is a box-like enclosure containing the film reels 18 and 18', the vacuum back 19, and idler rolls 20 and 20', adapted to direct the film through the vacuum back 19. The camera back is detachably connected to the bellows 21 by means of the rotatable latches 22 and 22' which clamp the rim member 23 at the upper extremity of the bellows 21 to the lower wall 24 of the camera back 17. The extremity of the bellows 21 is retained between the rim member 23 and a second rim member 25 and when the latter is clamped to the front wall 24 the connection is perfectly light proof.

The lower wall 24 of the camera-back is provided with a film exposure opening 26 for the admission of rays from a lens contained within the lens piece or holder 27 which enter to contact the film 28.

Adjacent the upper surface of the lower wall 24 of the camera back 17 is mounted the vacuum back 19. The vacuum back 19 comprises a box-like structure containing a central vacuum chamber 29 and having a lower wall consisting of a perforated plate 30. The vacuum back 19 is provided with oppositely extending connecting members 31 and 31' which are connected respectively to armatures 32 and 32' of the solenoids 33 and 33' which impart a reciprocating movement to the vacuum back 19 to effect a step by step movement of the film as will be further explained. Projecting upward from the center of the vacuum back is an upright 34, and above and at opposite sides of the vacuum back 19 is located a cover member 35 which is attached to the supporting walls 36 and 36' which extend to the upper and lower walls of the camera back 17. The cover member 35 is provided with two centrally located rectangular openings 37 and 37' through which project adjustable stop members 38 and 38' which limit the motion of the vacuum back 19 in either direction. These stop members 38 and 38' are threadedly connected to thumb screws 39 and 39' which are mounted in standards 40 and 40', the latter being connected to the cover member 35. The thumb screws are provided with lock nuts 41 and 41' respectively which prevent their turning after the stop members are adjusted to their proper location.

The vacuum chamber 29 is connected through a nipple 42, projecting from the upper surface thereof, to a piece of flexible tubing 43 which in turn is connected to the intake tube 44 of a vacuum pump 45. The vacuum pump 45 is operated by a solenoid 46 having a spring returned armature 47. The vacuum pump 45 and the solenoid 46 are supported from a wall of the camera back 17 by means of the brackets 51 and 52 respectively.

Within the camera back are also located the film spools or reels 18 and 18', the unexposed film being wound on the reel 18 and the exposed film being wound on motor-driven reel 18'.

Figure 3:
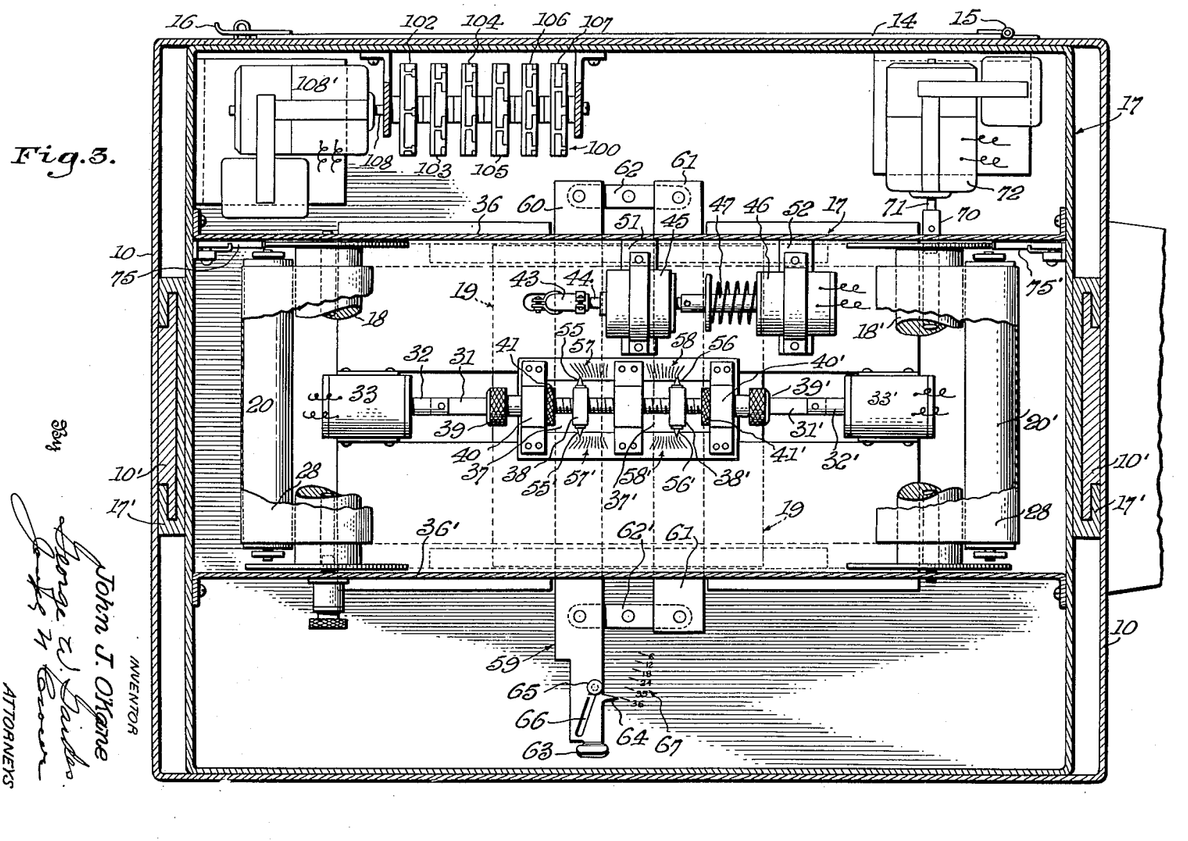
Fig. 3 is horizontal sectionized view taken on the line 3—3 of Fig. 2.
Figure 6:
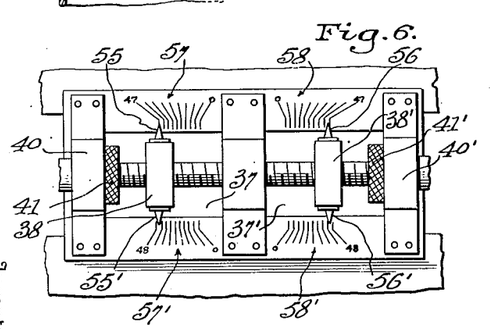
Fig. 6 is an enlarged detailed plan view of stop adjusting means shown in Fig. 3.

The stop members 38 and 38' are provided with pointers 55, 55' and 56, 56', as shown in Fig. 6, and the top of the cover member is provided with scales 57, 57' and 58, 58'. The pointers indicate, on these scales, the location of the stop members 38 and 38' and thus indicate to the operator the distance of movement of the film and the position of the exposed portion thereof in relation to the exposure opening 26 in the lower wall of the camera back 17. The scales are laid out in points, where, in the language of the printer, 72 points are equal to one inch. To control the width of the exposure opening 26 horizontal shutters 59 are provided. These shutters comprise two strips 60 and 61 which are pivotally connected to links 62 and 62' at either end thereof. The links are pivoted centrally, thus the movement of one shutter either away from or towards the other shutter, moves the opposite shutter in the same manner so that the shutters are always parallel. The shutter 60 is provided with a handle 63, a pointer 64, and a set screw locking device 65, to retain the shutters in a fixed position. See Fig. 3. The set screw 65 projects through a slot 66 in the handle of shutter 60. Scale 67 is provided to indicate the position of the pointer and thus show the length of the exposure opening.

Figure 7:
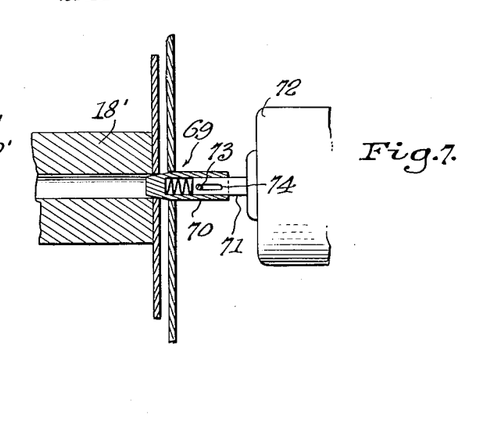
Fig. 7 is a detailed sectional view of the film reel driving means.
Figure 9:
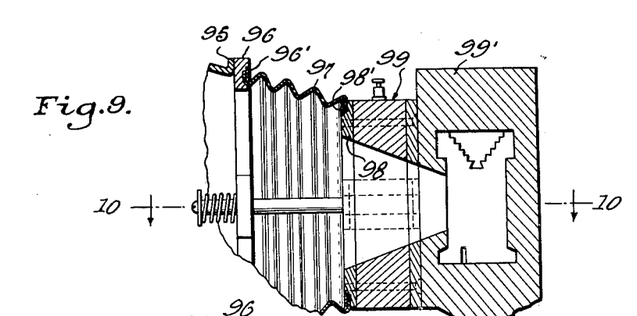
Fig. 9 is a detailed vertical section of the magnetically operated facing adapted, when energized, to contact the mold facing of the Linotype machine to unite the camera casing therewith.

Within the camera back are rotatably mounted the film reels 18 and 18' as mentioned above. The reel 18, holding the unexposed film, is supported in the usual manner as in any ordinary camera, that is, a trunnion at one end of the reel fits into a hold in a supporting member, and the opposite end of the reel is supported by a plunger member which extends into the reel, the plunger member being held in operative postion by a spring (not shown), and is released from the reel when the plunger member is withdrawn against the action of the spring. The take-up reel 18' which holds the exposed film is connected to a motor shaft by a spring clutch member 69 as shown in detail in Fig. 7, and which consists of a slidable sleeve 70 which is mounted on the shaft 71, of a motor 72, by the pin 73 which is slidable within the slot 74 in the motor shaft. Two drag or brake members 75 and 75' are connected to the side walls of the camera back to retard the free movement of the reels. The motor drive on the take-up reel is utilized to prevent slack in the film. The magnets 33 and 33' move the vacuum back 19 back and forth and with its movement towards the take-up reel a vacuum is created in the vacuum back 19 which causes the film to adhere to it and be moved with the perforated plate 30. At the end of the movement towards the take-up reel, the vacuum is released.

As described above, the camera is provided with a lens piece or holder 27, which supports a lens (not shown). The lens piece 27 is mounted in an adjustable base or platform 77 which may be raised and lowered to a proper focusing distance from the object and locked in place by a set screw 78. A scale 77' is provided to indicate the focus adjustment. The lens piece 27 is provided with an electrically-operated shutter 79. The operating mechanism comprises a solenoid 80 the armature 81 of which is connected to the shutter lever 82.

Upon the lower wall or floor 83 of the camera housing is mounted a mirror 84 which is tilted at an angle of 45° to the floor, and on one side of the camera is an extension which projects therefrom and has slanting walls extending from the side wall and floor of the camera. Adjacent opposite side walls, lamps 93 and 93' are located which are provided with reflectors 94 and 94'.

The projection terminates in a flat vertical flange surface 95 to which is attached a rim 96 of a bellows 97. The bellows is retained to the rim 96 by a second rim 96', the extremity of the bellows being clamped between the rims 96 and 96'. The outer extremity of the bellows is clamped between an outer rim 98 and an inner rim 98', and to the outer rim 98 is attached a magnetically operated coupling 99 having a central opening therein with slanting side walls. This coupling is adapted to be attached magnetically to the mold bar 99' of a Linotype machine and thus form a light proof connection therewith for the purpose of photographing the matrices 100 held by the mold bar 99'.

The various elements of the camera which effect the movement of the film, the operation of the lens shutter, and the taking up of slack in the film, are controlled electrically by a motor-driven switch mechanism 100 which is operatively connected to the space band bar 101.

The switch mechanism (see Figs. 15, 16 and 18) comprises a series of discs 102, 103, 104, 105, 106 and 107 which are attached to a shaft 108 rotated by an electric motor 108', which is connected to intake and return leads 137' and 150 through the conductors 136' and 138'. The discs are formed of insulating material and are bounded circumferentially by metallic bands or rims, one side of which, designated by the numerals 109, 110, 111, 112, 113, and 114, entirely surround the discs, and the other side of which rims are formed in several segments designated by the numerals 109', 110', 111', 112', 113' and 114' which are connected to the continuous circumferential portion of the bands by bridging portions designated by the numeral 115, and which pass across the perimeter of the discs. A frame 116 which is located adjacent the discs, supports on one side thereof, a plurality of brushes, one for each disc which are designated by the numerals 117, 118, 119, 120, 121 and 122. These brushes contact the continuous portions of the metallic rim, and on the other side of the frame are supported an equal number of brushes designated by the numerals 117', 118', 119', 120', 121' and 122' which contact the segmental portions of the rim. These brushes are connected to the feed line 137' respectively through the conductors 130', 131', 132', 133', 134' and 135'.

Figure 16:
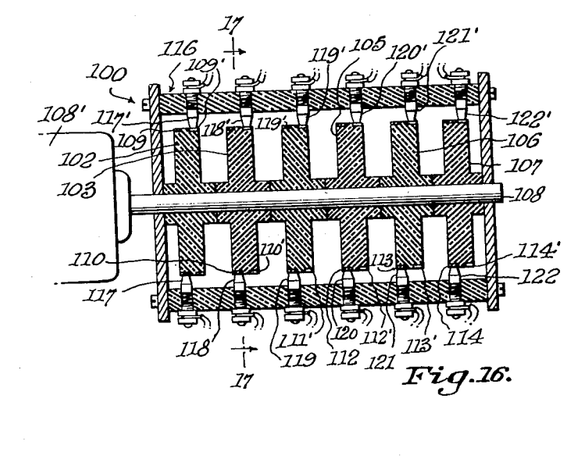
Fig. 16 is a detailed sectional view of the assembled circuit maker and breaker.
Figure 17:
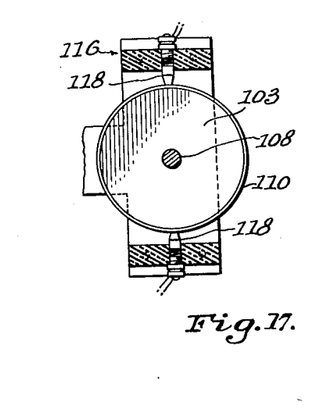
Fig. 17 is a section on line 17—17 of Fig. 16.
Figure 18:
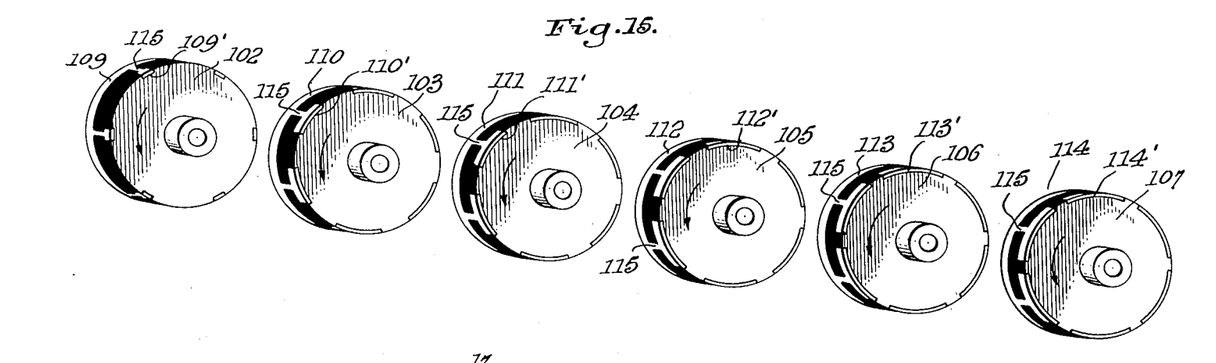
Fig. 18 is diagrammatic perspective of the switch discs and the electrical circuit to various electrically controlled elements of the apparatus.

The brushes 117, 118, 119, 120, 121 and 122 contact the continuous rims 109, 110, 111, 112, 113 and 114, and connect them electrically through the conductors 130, 131, 132, 133, 134 and 135, which operate respectively the solenoid 33 to effect the return movement of the vacuum back 19, the solenoid 80 which operates the camera shutter 79, the magnetically connected facing 99, the film reel motor 72, the vacuum back solenoid 33' which operates the forward movement of the vacuum back, and the solenoid 46 which operates the vacuum pump 45. All the various elements, that is, the solenoid 33, the solenoid 80, the magnets of the magnetic facing, the film reel motor 72, and the vacuum back solenoid 33', and vacuum solenoid 46 are connected to the return lead 150 respectively by the conductors 151, 152, 153, 150, 153, 154 and 155.

Figures 10, 13:
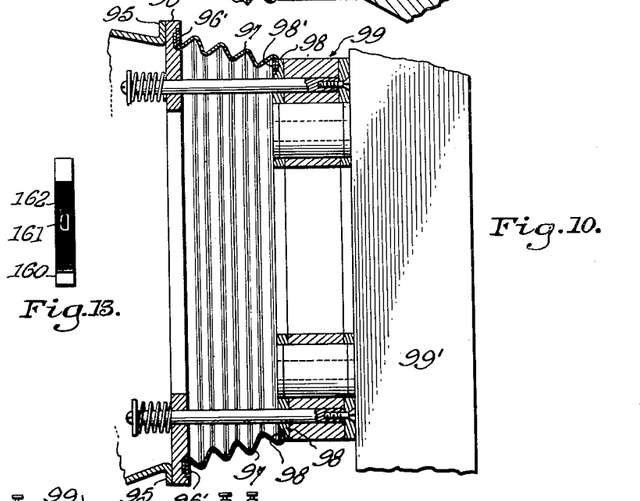
Fig. 10 is a horizontal sectional view taken on the line 10—10 of Fig. 9.
Fig. 13 is an edge view of the matrix shown in Fig. 12.
Figure 11:
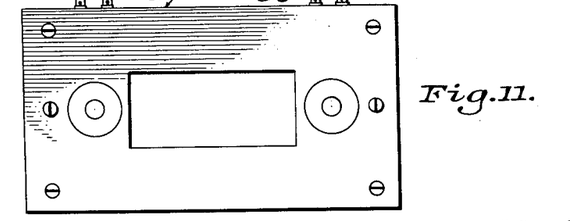
Fig. 11 is a front elevation of the magnetic facing.
Figure 12:
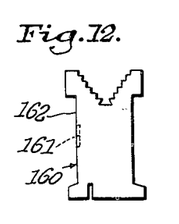
Fig. 12 is a detail side elevation of a matrix used with the apparatus.

The matrices to be used with this photographic device or camera must be specially designed, as illustrated in Figs. 12 and 13 and designated by the numeral 160. The cut-in type 161 shown in the design is filled with a white lacquer or similar material and is baked in. The background 162 is made a photo or dead black color. The matrices will then have a white letter image 161 on a black background 162 and both background and letter will be on the same plane.

These various elements of the apparatus are operated electrically in sequence by the rotary disc switch so that the various functions necessary to the operation of the apparatus will occur in their proper order as will be fully explained in the description of the operation of the device which follows.

Figure 14:
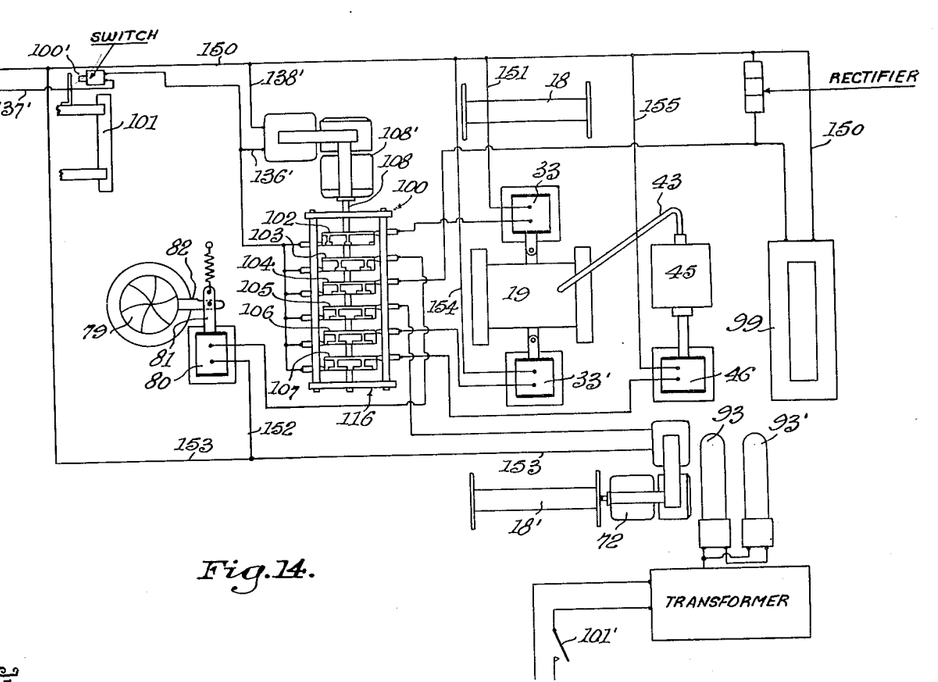
Fig. 14 is an electric wiring diagram of the apparatus.

When operating the device, the camera back 17 is loaded with film or paper in the darkroom and inserted in the camera housing 19. The Linotype or Intertype operator then sets up a line of matrices. He sends the line forward in the machine to the position normally used when the machine casts a lead type slug. At this point the space band expander bar 101 (Fig. 14) on the Linotype or Intertype comes up and while expanding the line of matrices to the desired width, automatically closes a circuit which, through the cam-type electrical control switch 100, sets up the following operations: the vacuum pump 45 creates a vacuum in the vacuum back 19, holding the film tightly; the vacuum back 19 is then moved by a solenoid 33' to the first position for exposure. A motor 72 takes up any slack in the film. The facing 99 then engages the mold bar 99', thereby concentrating all light to the face of the matrices. The shutter 79 of the lens piece 27 is then opened for the required exposure and then automatically closes. The exposure made, a solenoid 46 is then actuated releasing the suction holding the film to the vacuum back 19. Another or second solenoid 33 is then actuated which moves the film holder to its return position. The vacuum is again created holding the film tightly; the vacuum back 19 moves to the first position and another exposure is made. As many lines as desired may be exposed after which the film is removed and developed in the darkroom. This will be a positive. If the negative is desired the normal reversal to a negative may be processed in the darkroom.

The master switch 100' starts and maintains contact for operation of the various elements of the camera, as long as the space band bar keeps the circuit closed. This switch is synchronized to the Linotype or Intertype machine so that all operations are completed in 7½–8 seconds. The camera can photograph 6 lines per minute, which is the maximum an average operator can set in a minute.

Figures 1, 8:
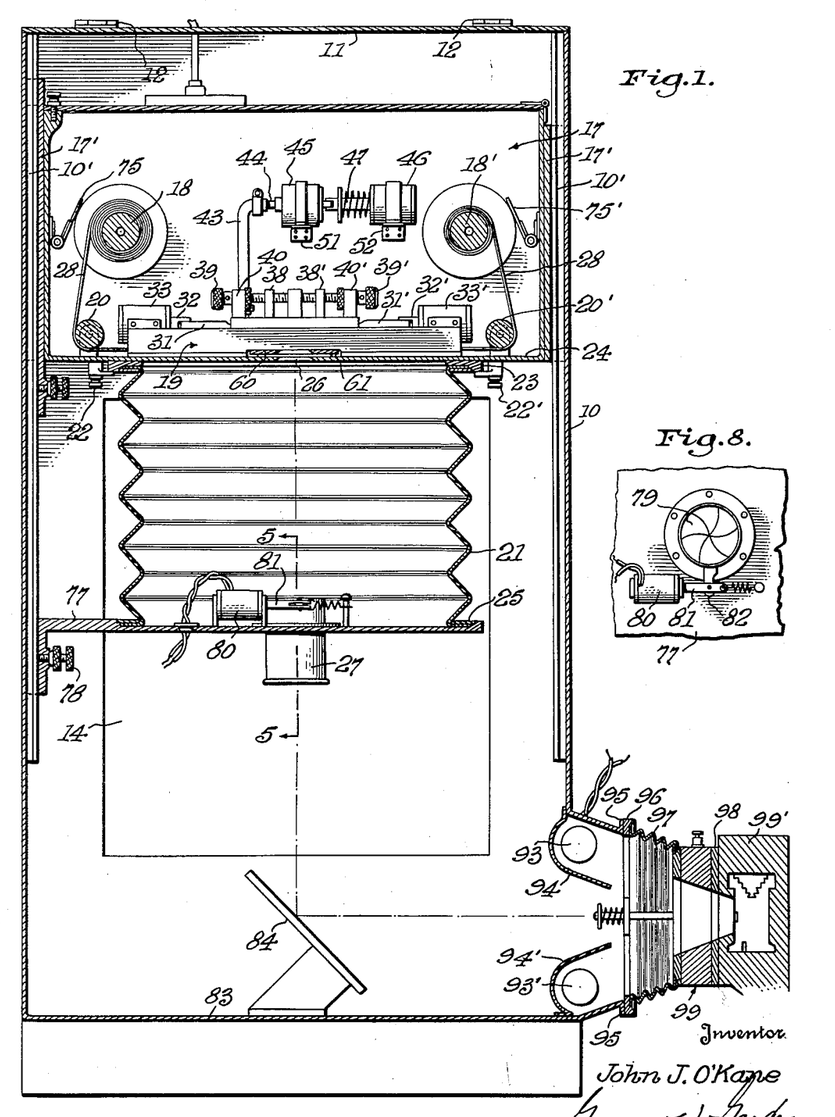
Fig. 1 is a central vertical section of the photographic device.
Fig. 8 is a detailed view of the shutter operating means.
Figure 2:
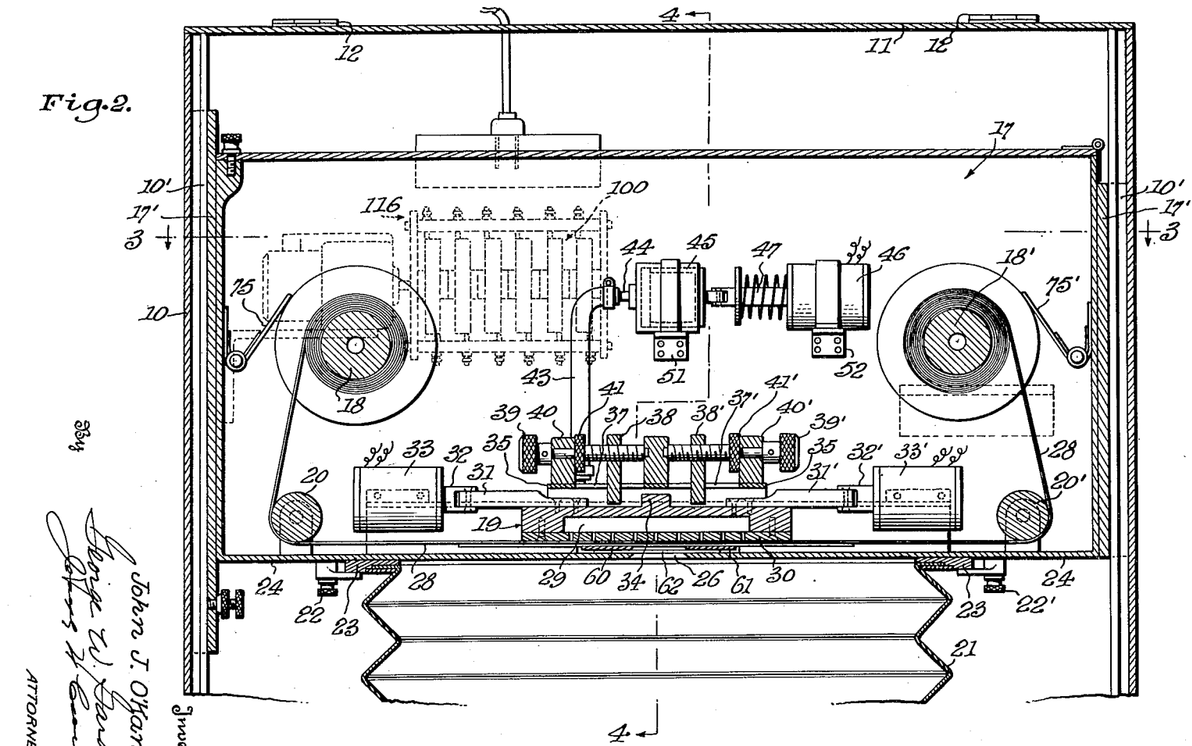
Fig. 2 is an enlarged sectionized view of the upper portion of Fig. 1.
Figure 4:
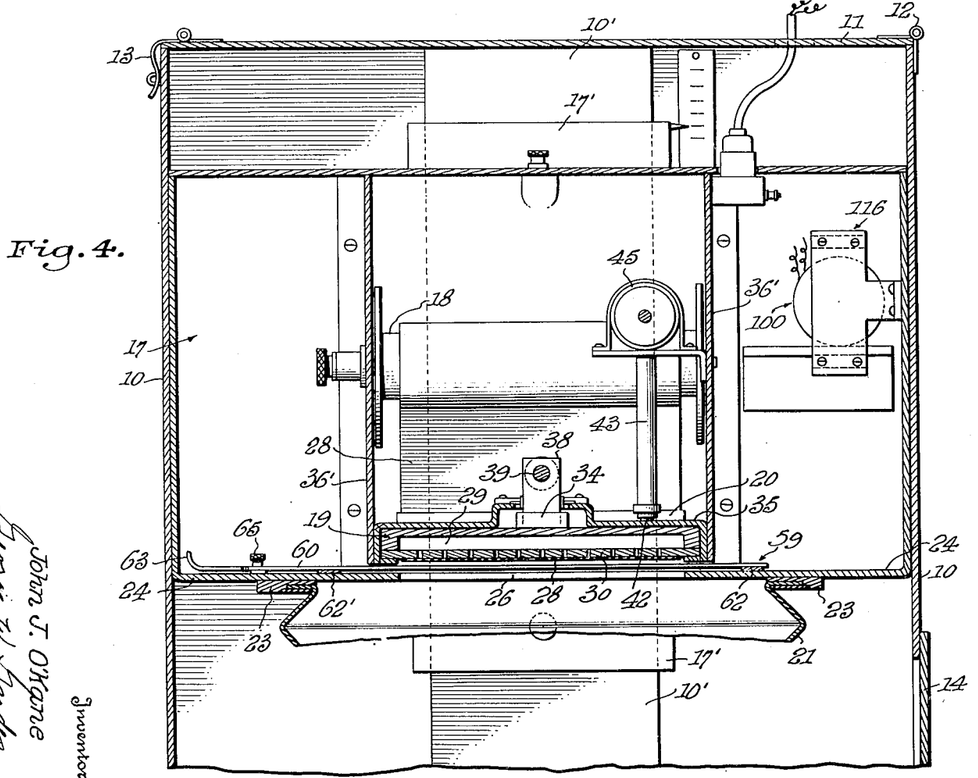
Fig. 4 is vertical sectionized view of the device taken on the line 4—4 of Fig. 2.
Figure 5:
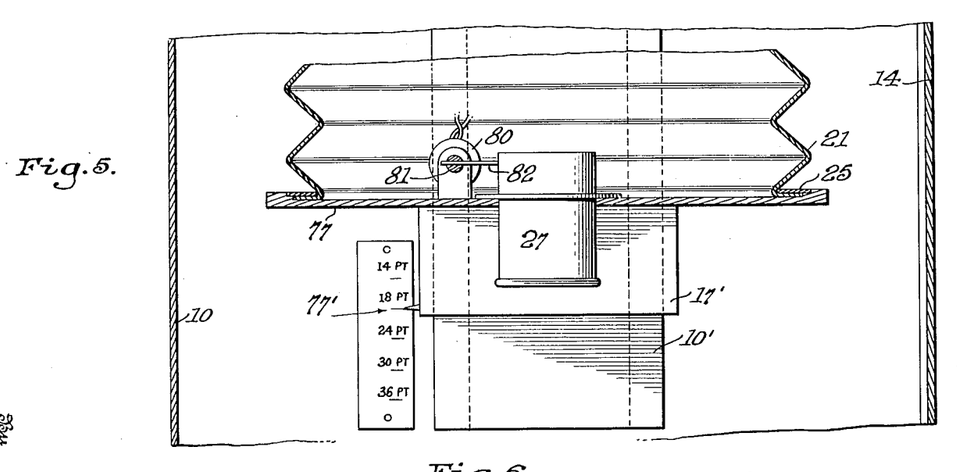
Fig. 5 is an enlarged detailed sectional view taken on the line 5—5 of Fig. 1.

The lamps 93 and 93' shown in Figs. 1 and 4 are operated by a separate switch 101' and are kept burning for the length of operation of the camera.

Having thus described my invention, what I claim as new and wish to secure by Letters Patent is:

1. An apparatus for automatically photographing type matter from a composed line of character-bearing matrices retained within a mold bar of a Linotype machine and operated by the space bar of said Linotype machine, said apparatus comprising a camera housing, electro-magnetic means for connecting the camera housing to said mold bar, for photographing matrices mounted in the mold bar, the connecting means including an electromagnetic facing on the camera housing, a bellows magnetically secured to the facing, and an electro-magnetically operated coupling between the bellows and the mold bar, a light source in the interior of said camera housing and adjacent said bellows for illuminating said matrices, means for concentrating light without appreciable loss thereof on the matrices, the said light being directed without dissipation from the matrices into the camera housing, a camera back having an exposure opening therein contained within said housing, a film feeding reel and a film take-up reel operatively mounted within said camera back, vacuum means including a movable vacuum chamber within the camera back for progressively feeding film between said reels, means for creating a vacuum within said vacuum chamber, and electromechanical means for moving said vacuum chamber to advance the film before the exposure opening, an adjustable platform mounted within said camera housing, a lens piece mounted within said platform, an exposure shutter associated with said lens piece and a bellows extending between said camera back and said platform and connected thereto, a mirror mounted within said camera housing adapted to direct substantially all reflected rays from said matrix through the lens piece to said film, and electrical control means interconnecting the space bar and vacuum means with the shutter for automatically advancing the film and operating the shutter successively in response to movement of the space bar.

2. An apparatus for automatically photographing type matter from a composed line of character-bearing matrices retained within a mold bar of a Linotype machine, said mold bar being operated by the space bar of said Linotype machine, said apparatus comprising a camera housing provided with an aperture for admitting light into the camera housing, means for connecting the housing through the aperture to the mold bar, the said connecting means including a bellows intermediate the housing and the mold bar, a magnetic coupling intermediate the mold bar and the bellows, an electromagnetic facing for connecting the camera housing through the bellows to said mold bar, a light source in the interior of said camera housing and adjacent to said bellows for illuminating said matrices, reflecting means adjacent to the light source for concentrating light from the said light source onto the matrices, the said concentrated light being directed without appreciable dissipation from the matrices through the aperture in the camera housing, a camera back having an exposure opening mounted within said housing, a lens piece having a shutter carried by said camera back, a solenoid adjacent thereto having its armature operatively connected to control the shutter, a film feeding reel and a film take-up reel mounted within said camera back and a vacuum chamber; a pump for creating a vacuum within said vacuum chamber, and solenoids for imparting a reciprocating movement to said vacuum chamber for advancing the film before said exposure opening, an adjustable platform mounted within said camera housing, a lens piece mounted within said platform, an exposure shutter in connection with said lens piece, a bellows extending between said camera back and said platform and connected thereto, a mirror mounted within said camera housing adapted to direct the reflected rays from said matrices through the lens piece to said film, and switching means operatively associated with the space bar, and electrical circuit means including a source of power operatively interconnecting the switching means, electromagnetic facing, and pump-, chamber-, and shutter-solenoids to automatically advance the film, and to automatically energize the magnetic facing and to operate the shutter successively in response to movement of the space bar.

3. An apparatus as described in claim 2, wherein the said plurality of solenoids includes a pair of solenoids having their armatures operatively connected to opposite sides of said vacuum chamber to effect reciprocal movement thereof, and said electrical circuit means is connected to energize one of said solenoids to advance the film responsive to movement of said space bar, then to energize said vacuum pump solenoid following film exposure, and finally to energize said other chamber solenoid to restore the chamber to the initial film-advancing position.

4. The apparatus as claimed in claim 2, which further comprises drive mechanism for moving the film, which drive mechanism includes a pair of reels carrying the film therebetween, a vacuum chamber having an opening adjacent the film, vacuum-producing means operatively connected to said chamber, means for energizing the vacuum-producing means, and mechanism for driving one of the reels in synchronism with the moving film.

5. The apparatus claimed in claim 2 which includes a film drive comprising a pair of spaced reels carrying a film strip therebetween, a vacuum chamber intermediate the reels having an opening adjacent the film strip, vacuum-producing means operatively connected to said chamber, means automatically energizing the vacuum-producing means in response to changes in subject matter, and mechanism for driving one of the reels in synchronism with the moving film strip.

6. The apparatus claimed in claim 2 which further includes a film drive comprising a pair of spaced reels carrying a film strip therebetween, a vacuum chamber intermediate the reels having an opening adjacent the film strip, vacuum-producing means operatively connected to the chamber, electromechanical means operatively connected to said vacuum-producing means, electrical switching means operatively associated with the changing subject matter, an electrical circuit including a source of power interconnecting the switching means and electromechanical means, whereby the vacuum-producing means is automatically energized responsively to changes in subject matter, and mechanism for driving one of the reels in synchronism with the moving film.

7. The apparatus claimed in claim 2, which further includes a film drive comprising a pair of spaced reels carrying a film strip therebetween, a vacuum chamber intermediate the reels having an opening adjacent the film strip, vacuum-producing means operatively connected to said chamber, a lens and shutter mechanism, electromechanical means operatively connected to said shutter mechanism and vacuum-producing means, electrical switching means operatively associated with the changing subject matter, an electrical circuit including a source of power interconnecting the switching means and the electromechanical means whereby the vacuum-producing means and shutter mechanism are automatically energized in sequence responsive to changes in subject matter, and mechanism for driving one of the reels in synchronism with the moving film strip.

8. The apparatus as claimed in claim 2, which further includes a film drive and lens-shutter mechanism, a housing therefor, means adapted to photographically couple said camera housing to said changing subject matter, a plurality of electromechanical devices operatively connected to said film drive and shutter mechanism respectively, a source of power, switching means, and circuit means connecting each of said film drive and shutter mechanism, electromechanical devices, and said electromagnetic means across the source of power through said switching means, said switching means being operatively associated with the changing subject matter to energize said circuit in response thereto.

9. The apparatus claimed in claim 2, which further includes a film drive and lens-shutter mechanism, a housing therefor, means adapted to photographically couple said camera housing to said changing subject matter, a plurality of electromechanical devices operatively connected to said film drive and shutter mechanism, respectively, a control circuit including a source of power, a line switch operatively associated with the changing subject matter to energize said circuit in response thereto, a commutator type electrical control switch having a plurality of selective contacts, and circuit means connecting each of said electromechanical devices and electromagnetic means across said source of power through selected contacts on said control switch.

10. Apparatus as claimed in claim 2, which further includes a housing, means including an electromagnetic facing for photographically coupling said housing to said changing subject matter, a camera back in said housing having an adjustable exposure opening and enclosing a film drive, said film drive comprising a pair of spaced reels carrying a film strip therebetween, a movable vacuum chamber intermediate the reels having an opening adjacent the film strip, vacuum-producing means operatively connected to the chamber, a lens and shutter mechanism, connected through a bellows to the camera back, a chamber-advancing solenoid having its armature coupled to one side of said chamber, a chamber-retracting solenoid having its armature coupled to the other side of the chamber, a plurality of adjustable stops for limiting movement of the chamber in either direction, a vacuum-control solenoid having its armature coupled to the vacuum-producing means, mechanism for driving one of the reels in synchronism with movement of the film strip, a shutter operating solenoid having its armature coupled to the shutter mechanism, a control circuit including a source of power, a line switch operatively associated with the changing subject matter to energize said circuit in response thereto, a commutator type electrical control switch having a plurality of selected contacts disposed in different relative spaced positions thereon, each of said contacts being adapted to operate in succession and including a first operating contact adapted to energize and maintain said vacuum control solenoid in operation until a second and third operating contact have been released, said second and third operating contacts being adapted to energize said chamber-advancing solenoid and reel drive mechanism respectively, a fourth operating contact adapted to energize and maintain said electromagnetic facing until a fifth operating contact has been released, said fifth operating contact being adapted to energize said shutter control solenoid, the above-indicated operative succession being followed by operation of a sixth contact adapted to energize said chamber-retracting solenoid, and circuit means independently connecting each of said solenoids, electromagnetic facing, and reel drive mechanism across said source of power through the corresponding operating contacts.

11. In the apparatus as set forth in claim 10, said commutator electrical control switch comprising a plurality of axially spaced aligned cylindrical surfaces, each of said cylindrical surfaces having an electrical conducting material coextensive with one peripheral edge thereof, said conducting material extending axially to the other peripheral edge at a plurality of radially spaced positions on each cylindrical surface in predetermined relation relative to the several cylindrical surfaces, a brush associated with each continuous conducting surface and connected to one side of a corresponding circuit to be energized, another brush associated with each non-continuous conducting surface, and connected to the other side of the corresponding circuit to be energized, and means initiated by operation of said line switch for driving said axially aligned cylindrical surfaces as a unit to complete one revolution per cycle of apparatus operation.

12. A camera comprising a housing, a camera back in the housing having an adjustable exposure opening controlled by a shutter and enclosing a film drive, the said film drive comprising a pair of spaced reels carrying a film strip therebetween, a movable housing defining a vacuum chamber intermediate the reels having an opening adjacent to the film strip for adhering the strip to the chamber responsively to production of vacuum in the chamber, vacuum-producing means operatively connected to the chamber and adhering the film strip to the opening in the chamber, means for moving the vacuum chamber for step by step feeding of the film strip relative to the reels during application of vacuum to the vacuum chamber responsively to operation of the shutter to open the exposure opening, and means for returning the vacuum chamber to original position responsively to release of vacuum and the film strip therein, the said film strip being fed progressively during reciprocation of the vacuum chamber in the direction in which the film strip lies.

13. A camera comprising a housing, a camera back in the housing having an adjustable exposure opening controlled by a shutter and enclosing a film drive, the said film drive comprising a pair of spaced reels carrying a film strip therebetween, one of the reels being a film take-up reel and the other of the reels being a film pay-off reel, a housing defining vacuum chamber intermediate the reels having an opening adjacent to the film strip, vacuum-producing means operatively connected to the vacuum chamber, solenoid means for effecting lateral reciprocation of the vacuum chamber for effecting step by step movement of the film, adjustable stop means for limiting movement of the vacuum chamber in either direction, solenoid means for controlling actuation of the vacuum-producing means, a motor for operating the film take-up reel, electrical circuit means connecting the vacuum-producing means, the vacuum chamber reciprocating solenoids, the camera shutter and the film take-up reel motor, a source of current for supplying current to the circuit means and a commutator-type electrical control switch having a plurality of selected contacts disposed in different relative spaced positions thereon, each of the contacts being adapted to operate in succession and including a first operating contact adapted to energize and maintain the vacuum control solenoid in operation until second and third operating contacts on the control switch have been released, the said second and third operating contacts being adapted to energize the vacuum chamber-advancing solenoid and reel drive motor, respectively, the said switch also including a shutter-control contact for actuating the shutter, the said first operating contact applying vacuum to exposed film after exposure thereof through the camera opening, the second and third operating contacts then energizing the chamber-advancing solenoid and reel drive motor respectively, and a still further contact on the said switch for then energizing the vacuum chamber-retracting solenoid for retracting the vacuum chamber to initial position for advancing a further portion of the film after exposure thereof.

14. A camera comprising a housing, a camera back in the housing having an adaptable exposure opening controlled by a shutter and enclosing a film drive comprising a pair of spaced reels carrying a film strip therebetween, reciprocable vacuum means having an aperture therein adjacent to the film strip for engaging the film strip for adhering the film strip to the vacuum means during application of a vacuum to the vacuum means, the said film strip being released from the vacuum means responsively to release of vacuum from the vacuum means, and instrumentalities for reciprocating the vacuum means for effecting step by step movement of the film strip responsively to each actuation of the shutter for exposing successive portions of the film strip, the vacuum means being reciprocable by the said instrumentalities in the direction in which the film strip lies, reciprocation of the vacuum means feeding the film strip progressively in the said direction.

JOHN J. O'KANE.

REFERENCES CITED

The following references are of record in the file of this patent:

UNITED STATES PATENTS

| Number | Name | Date |
| --- | --- | --- |
| 631,222 | Mason | Aug. 15, 1899 |
| 2,042,041 | Friedman et al. | May 26, 1936 |
| 2,178,380 | Spievak | Oct. 31, 1939 |
| 2,232,240 | Jones | Feb. 18, 1941 |
| 2,347,732 | Briechle et al. | May 3, 1944 |
| 2,380,034 | Doyle | July 10, 1945 |
| 2,377,754 | Bryce | June 5, 1945 |
| 2,388,961 | Elliott et al. | Nov. 13, 1945 |
| 2,393,534 | Hineline | Jan. 22, 1946 |